United States Patent
Chen et al.

(10) Patent No.: US 11,297,157 B2
(45) Date of Patent: Apr. 5, 2022

(54) DATA CAPTURING DEVICE AND DATA CALCULATION SYSTEM AND METHOD

(71) Applicant: Wistron Corporation, New Taipei (TW)

(72) Inventors: Chih-Ming Chen, New Taipei (TW); Yen-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 78 days.

(21) Appl. No.: 16/551,733

(22) Filed: Aug. 27, 2019

(65) Prior Publication Data

US 2021/0014325 A1 Jan. 14, 2021

(30) Foreign Application Priority Data

Jul. 11, 2019 (TW) ................................ 108124550

(51) Int. Cl.
| | |
|---|---|
| *H04L 29/08* | (2006.01) |
| *G06T 7/73* | (2017.01) |
| *H04W 4/38* | (2018.01) |
| *G06N 20/10* | (2019.01) |
| *H04L 67/59* | (2022.01) |
| *H04L 67/00* | (2022.01) |

(52) U.S. Cl.
CPC ......... *H04L 67/2861* (2013.01); *G06N 20/10* (2019.01); *G06T 7/73* (2017.01); *H04L 67/34* (2013.01); *H04W 4/38* (2018.02)

(58) Field of Classification Search
None
See application file for complete search history.

(56) References Cited

U.S. PATENT DOCUMENTS

| | | | |
|---|---|---|---|
| 2008/0133982 A1* | 6/2008 | Rawlins | H03F 1/3294 714/699 |
| 2016/0284095 A1* | 9/2016 | Chalom | G06K 9/627 |
| 2018/0053056 A1* | 2/2018 | Rabinovich | G06K 9/4628 |
| 2018/0082314 A1* | 3/2018 | Faith | G06K 9/00342 |
| 2018/0089505 A1* | 3/2018 | El-Khamy | G06T 7/11 |

(Continued)

FOREIGN PATENT DOCUMENTS

| | | |
|---|---|---|
| CN | 202859085 | 4/2013 |
| CN | 106649838 | 5/2017 |
| CN | 109376844 | 2/2019 |

OTHER PUBLICATIONS

H. Kanzaki, K. Schubert and N. Bambos, "Video Streaming Schemes for Industrial IoT," 2017 26th International Conference on Computer Communication and Networks (ICCCN), Vancouver, BC, 2017, pp. 1-7, doi: 10.1109/ICCCN.2017.8038533. (Year: 2017).*

(Continued)

*Primary Examiner* — Uzma Alam
(74) *Attorney, Agent, or Firm* — JCIPRNET

(57) ABSTRACT

A data capturing device and a data calculation system and method are provided. The data capturing device transmits sensing data to a computing device, and receives a machine learning model and a library corresponding to a current scene from the computing device. The data capturing device runs the machine learning model to capture feature data from the sensing data, runs the library to convert a requirement into a service task, and then transmits the feature data and the service task.

16 Claims, 5 Drawing Sheets

(56) References Cited

U.S. PATENT DOCUMENTS

| | | | |
|---|---|---|---|
| 2018/0264347 A1* | 9/2018 | Tran | A63B 71/145 |
| 2019/0150357 A1* | 5/2019 | Wu | A01C 21/00 |
| 2019/0251702 A1* | 8/2019 | Chandler | G06F 3/013 |
| 2019/0339687 A1* | 11/2019 | Celia | G05B 23/0291 |
| 2019/0339688 A1* | 11/2019 | Celia | G05B 19/41865 |
| 2020/0005404 A1* | 1/2020 | Patterson | G06F 9/4411 |
| 2020/0051260 A1* | 2/2020 | Shen | G06N 3/084 |
| 2020/0058135 A1* | 2/2020 | Mikhailov | G06T 7/0002 |
| 2020/0075025 A1* | 3/2020 | Suwabe | G10L 15/07 |

OTHER PUBLICATIONS

"Office Action of Taiwan Counterpart Application", dated Jul. 3, 2020, p. 1-p. 16.

* cited by examiner

DATA CAPTURING DEVICE AND DATA CALCULATION SYSTEM AND METHOD

CROSS-REFERENCE TO RELATED APPLICATION

This application claims the priority benefit of Taiwan application serial no. 108124550, filed on Jul. 11, 2019. The entirety of the above-mentioned patent application is hereby incorporated by reference herein and made a part of this specification.

BACKGROUND OF THE INVENTION

1. Field of the Invention

The present invention relates to a data collection and calculation mechanism, and more particularly to a data capturing device and a data calculation system and method.

2. Description of Related Art

Conventional smart cameras perform computing independently without the assistance of any computer or cloud server, and therefore need to be capable of performing a large amount of calculations. In addition, software is burned on firmware in conventional smart cameras, and the functions cannot be changed unless the firmware is updated. Therefore, as conventional smart cameras need to perform a large amount of calculations, the hardware design is complex, leading to high costs, and the functions provided are not flexible.

SUMMARY OF THE INVENTION

The present invention provides a data capturing device and a data calculation system and method, to reduce costs of the data capturing device.

The embodiments of the present invention provide a data capturing device, comprising: a sensor, configured to obtain sensing data; a first processing circuit, coupled to the sensor, and configured to run a machine learning model corresponding to a current scene to capture feature data corresponding to the current scene from the sensing data; and a second processing circuit, coupled to the first processing circuit, and configured to run a library corresponding to the current scene to convert a requirement corresponding to the machine learning model into a service task, and transmit the service task and the feature data through a communication chip.

The embodiments of the present invention provide a data calculation system, comprising: a computing device and a data capturing device. The data capturing device includes: a sensor, configured to obtain sensing data; a first communication chip, configured to transmit the sensing data to the computing device; a first processing circuit, coupled to the sensor and the first communication chip; and a second processing circuit, coupled to the first communication chip and the first processing circuit. The computing device includes: a second communication chip, configured to establish a communication connection with the first communication chip, to receive the sensing data from the data capturing device; and a processor, coupled to the second communication chip. In the computing device, the processor determines whether a scene of the sensing data has been transformed, and in response to determining the scene of the sensing data has been transformed, the processor selects a machine learning model corresponding to a current scene, determines a library based on the current scene, and then deploys the machine learning model and the library to the data capturing device through the communication connection. After the machine learning model and the library are deployed to the data capturing device, the first processing circuit runs the machine learning model to capture feature data corresponding to the current scene from the sensing data, and the second processing circuit runs the library to convert a requirement corresponding to the machine learning model into a service task of a data side, and transmits the service task of the data side and the feature data through the first communication chip.

The embodiments of the present invention provide a data calculation method, comprising: obtaining, by a data capturing device, a sensing data, and transmitting the sensing data to a computing device; determining, by the computing device, whether a scene of the sensing data has been transformed; selecting, by the computing device in response to determining that the scene of the sensing data has been transformed, a machine learning model corresponding to a current scene, and determining a library based on the current scene; deploying, by the computing device, the machine learning model and the library to the data capturing device; and running, by the data capturing device, the machine learning model to capture feature data corresponding to the current scene from the sensing data, running the library to convert a requirement corresponding to the machine learning model into a service task, and transmitting the feature data and the service task.

Based on the above, in the present invention, the computing device obtains through calculation data to be deployed to the data capturing device, and then deploys the data to the data capturing device. In this way, the data capturing device can be implemented using simple, inexpensive universal hardware, offering great flexibility.

In order to make the aforementioned and other objectives and advantages of the present invention comprehensible, embodiments accompanied with figures are described in detail below.

DESCRIPTION OF THE EMBODIMENTS

Figure 1:
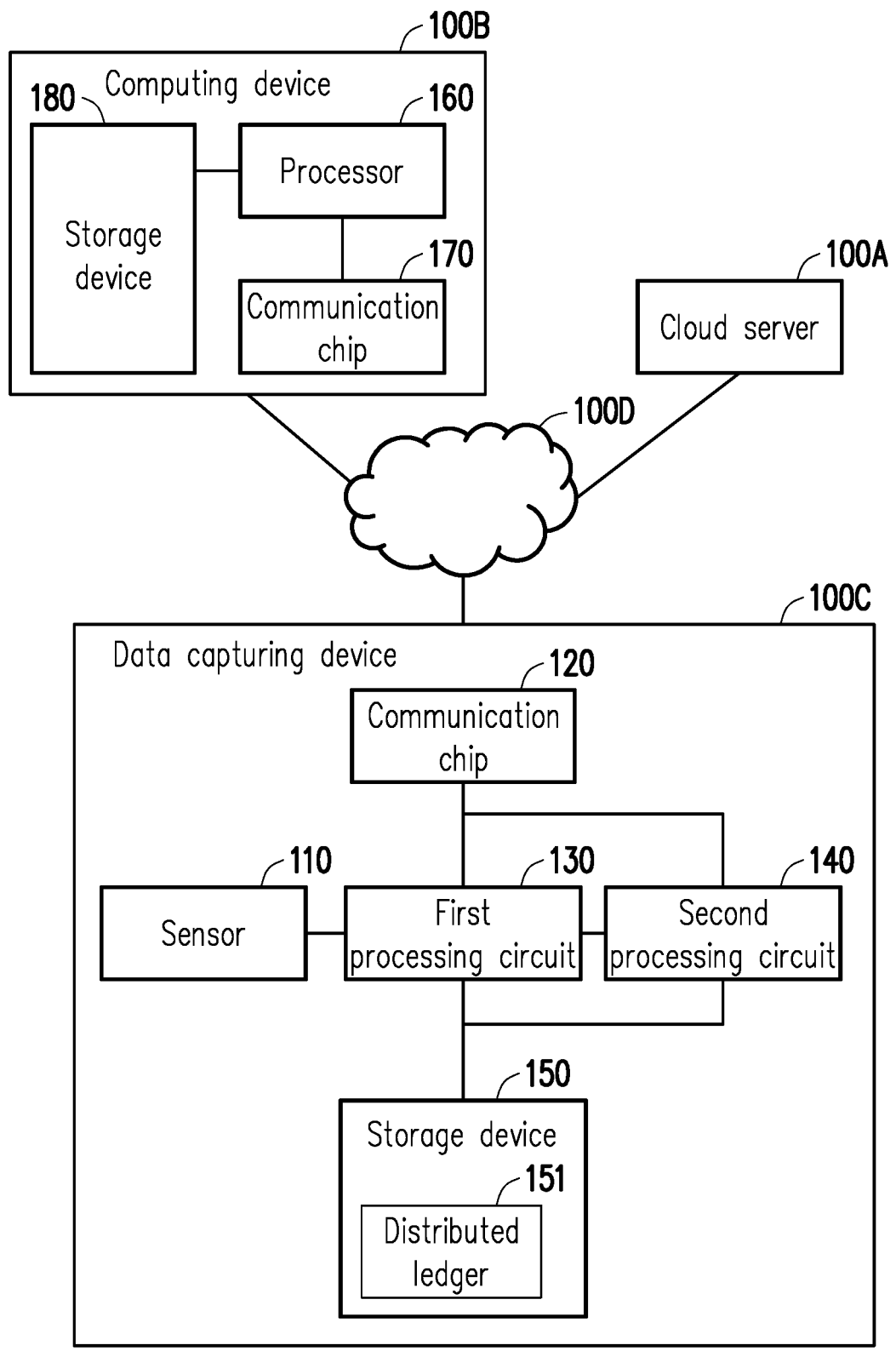
FIG. 1 is a block diagram of a data calculation system according to an embodiment of the present invention.

FIG. 1 is a block diagram of a data calculation system according to an embodiment of the present invention. Referring to FIG. 1, the data calculation system 100 includes a cloud server device 100A, a computing device 100B and a data capturing device 100C. The cloud server device 100A, the computing device 100B and the data capturing device 100C communicate with each other through the Internet 100D.

The cloud server device 100A is, for example, composed of one or more server hosts.

The computing device 100B is a common electronic device with computing power, such as a personal computer, a notebook computer, or the like. The data capturing device 100C is simple, inexpensive universal hardware mainly configured to collect data. The data capturing device 100C is an edge device, such as a camera device, a digital camera, or the like.

The data capturing device 100C collects sensing data through a sensor 110, and then transmits the collected sensing data to the computing device 100B. The computing device 100B obtains through calculation a machine learning model and a library (for example, a runtime library) corresponding to the sensing data collected by the data capturing device 100C. Then, the computing device 100B deploys the machine learning model and the library to the data capturing device 100C. After the deployment is complete, the data capturing device 100C captures feature data from the collected sensing data, and transmits the feature data to the cloud server device 100A. The cloud server device 100A analyzes the feature data. In this way, the data capturing device 100C can be implemented using simple, inexpensive universal hardware, offering great flexibility.

The data capturing device 100C includes a sensor 110, a communication chip 120, a first processing circuit 130, a second processing circuit 140 and a storage device 150. The sensor 110 is configured to obtain the sensing data. The sensor 110 is, for example, at least one of a motion sensor, an image sensor, an acoustic sensor, a smoke sensor, a light sensor and an ozone concentration sensor. The communication chip 120 is coupled to the first processing circuit 130 and the second processing circuit 140. The sensing data is transmitted to the computing device 100B through the communication chip 120, and the machine learning model and the library corresponding to the sensing data are received from the computing device 100B.

In the present embodiment, it is assumed that the data capturing device 100C captures only a video stream or an audio stream, one image sensor or one acoustic sensor is configured as the sensor 110. In other embodiments, if the data capturing device 100C is configured to capture a video stream and an audio stream simultaneously, one image sensor and one acoustic sensor are configured as the sensors 110. Therefore, the number of sensors 110 can be set according to requirements, and is not limited herein.

The first processing circuit 130 is coupled to the sensor 110, the storage device 150 and the communication chip 120. The second processing circuit 140 is coupled to the communication chip 120, the storage device 150 and the first processing circuit 130. After the deployment on the data capturing device 100C is complete, the first processing circuit 130 runs the machine learning model to capture the feature data from the sensing data, and transmits the feature data to the cloud server device 100A through the communication chip 120. The second processing circuit 140 runs a library of a service API management (API: application programming interface) to convert a requirement into a service task, and transmits the service task to the cloud server device 100A through the communication chip 120.

The requirement is a requirement of a user of an application program configured to execute a specified scene. For example, the specified scene includes three scenes: "face recognition", "speech recognition" and "motion positioning". If the sensing data includes a scene for face recognition, the requirement corresponding to the application program performing face recognition is high performance and low costs; if the sensing data includes a scene for speech recognition, the requirement corresponding to the application program performing speech recognition is low performance and high security; if the sensing data includes a scene for motion positioning, the requirement corresponding to the application program performing motion positioning is high performance and high accuracy. The requirements are described by way of example only, and the present disclosure is not limited thereto.

Examples are described below. It is assumed that the user of the application program configured to perform face recognition is most concerned with high performance and low costs among performance, costs, security or other service metrics. The high performance is, for example, frames per second (FPS) being greater than 15, and the low costs are set to a recognition fee of less than USD 1. The second processing circuit 140 may translate the requirement into the following service task: "face recognition$ performance:FPS>15 & cost:recognition fee<USD 1". Then, the service task is transmitted to the cloud server device 100A, so that a scheduler in the cloud server device 100A finds a resource having a corresponding resource capability, to meet the requirement corresponding to performance and costs. Therefore, after conversion of the library, the cloud server device still can rapidly recognize the actual requirement according to the service task and allocate a corresponding resource.

The first processing circuit 130 and the second processing circuit 140 may each be implemented using a dedicated System on Chip (SoC). For example, the first processing circuit 130 is implemented using a Movidius chip from Intel, and the second processing circuit 140 is implemented using a multi core processor from ARM. Alternatively, one SoC is used, and two cores are run on the SoC to respectively implement the first processing circuit 130 and the second processing circuit 140.

The communication chip 120 is, for example, a network card, a WiFi chip, or a mobile communication chip, or the like. The storage device 150 is, for example, any type of fixed or removable random access memory (RAM), read-only memory (ROM), flash memory, secure digital memory card (SD), hard disk or other similar devices or a combination thereof. The storage device 150 includes a distributed ledger 151. The data capturing device 100C can receive a virtual currency or execution record from the cloud server device 100A through the communication chip 120, and store the virtual currency or the execution record to the distributed ledger 151. The virtual currency is, for example, an IOTA crypto currency, and the execution record is a record of an execution status, response time or result integrity of each task run by the cloud server device 100A, and can be subsequently tracked by the data capturing device 100C or used as a basis for charging or paying for particular services.

The distributed ledger 151 is a database distributed on a plurality of nodes or computer devices. The nodes are geographically distributed in a plurality of networks, institutions or countries. Each node copies and stores the same ledger copy, and data in the ledger is shared. The most prominent feature of the distributed ledger 151 is that it is not maintained by a single institution or individual, but is separately created and recorded by each node in the network. That is to say, the computing device 100B and the cloud server 100A also include the distributed ledger (to be described below).

The computing device 100B includes a processor 160, a communication chip 170 and a storage device 180. The communication chip 170 is configured to establish a communication connection with the communication chip 120 of the data capturing device 100C, or connect to the cloud server 100A. The processor 160 is coupled to the communication chip 170. The processor 160 is, for example, a central processing unit (CPU), a graphic processing unit (GPU), a physics processing unit (PPU), a programmable microprocessor, an embedded control chip, a digital signal processor (DSP), an application-specific integrated circuit (ASIC) or other similar devices. The communication chip 170 is, for example, a network card, a WiFi chip, or a mobile communication chip, or the like.

The storage device 180 is, for example, any type of fixed or removable random access memory (RAM), read-only memory (ROM), flash memory, secure digital memory card (SD), hard disk or other similar devices or a combination thereof. The storage device 180 stores a plurality of program code segments. After being installed, the program code segments are executed by the processor 160 to implement the following data calculation method.

That is, after the sensing data transmitted by the data capturing device 100C is received through the Internet 100D, the processor 160 determines whether a scene of the sensing data has been transformed. For example, the sensing data is video data and audio data, and three scenes "face recognition", "speech recognition" and "motion positioning" are set. However, the three scenes are merely provided for convenience of description, and the types and number of scenes are not limited herein. The scenes may also include a "vehicle sound recognition" scene and a "screaming recognition" scene.

The processor 160 analyzes the video data and the audio data to determine the content of data conforms to which type of scene. When determining that the scene of the sensing data has been transformed, the processor 160 selects a machine learning model corresponding to the scene which has transformed, and determines a library based on the machine learning model. Then, the processor 160 deploys the machine learning model and the library to the data capturing device 100C through the communication connection established between the communication chip 170 and the communication chip 120.

The library corresponds to the detected scene. For example, a library used for the "face recognition" scene is capable of converting a requirement related to "face recognition" into a corresponding service task.

Figure 2:
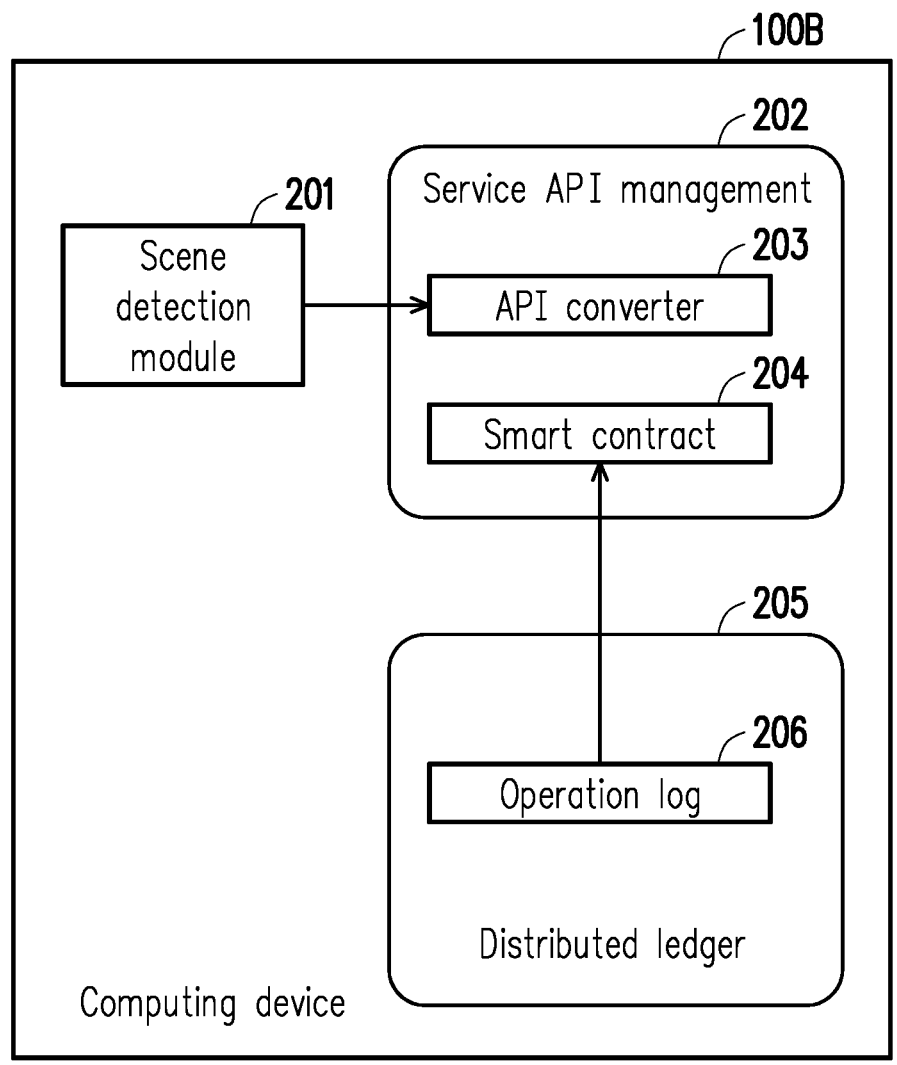
FIG. 2 is a block diagram of a computing device according to an embodiment of the present invention.

FIG. 2 is a block diagram of a computing device according to an embodiment of the present invention. Referring to FIG. 2, the plurality of program code segments stored in the storage device 180 of the computing device 100B provides the following modules: a scene detection module 201, a service API management 202 and a distributed ledger 205.

The scene detection module 201 is configured to analyze the scene in the sensing data to determine whether the scene is transformed. In particular, the scene detection module 201 captures a scene semantic feature from the sensing data, and inputs the scene semantic feature and scene semantic features of a few known scene samples collected in advance into a transductive support vector machine to classify the scene.

Figure 3:
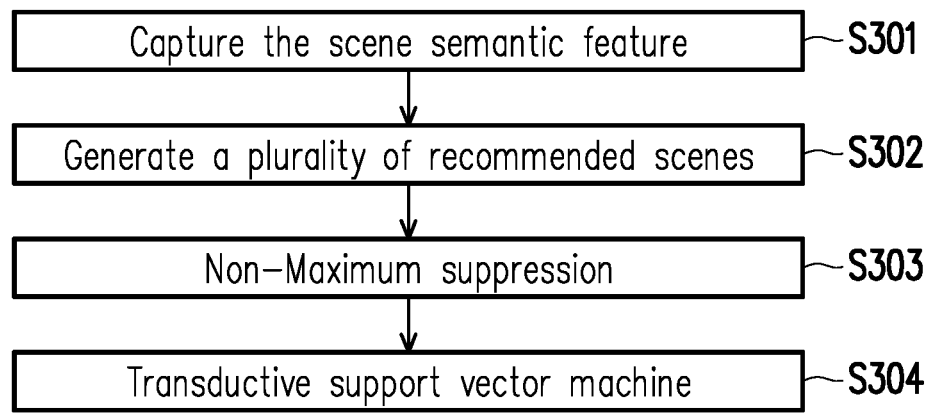
FIG. 3 is a flowchart of a scene detection method according to an embodiment of the present invention.

Steps of the scene detection method executed by the scene detection module 201 are described by way of example below. FIG. 3 is a flowchart of a scene detection method according to an embodiment of the present invention. Referring to FIG. 3, in step S301, captures the scene semantic feature. In particular, a semantic feature layer in a deep semantic similarity model (DSSM) is used to capture a first scene semantic feature from a plurality of (a small number of) known scene samples, and capture a second scene semantic feature from a plurality of (a large number of) unknown scene samples (for example, data received from the sensor 110) for which no scene is marked. The "known scene samples" are, for example, a few video/audio samples (for example, video clips or audio clips) collected in advance, and have been marked with corresponding scenes. For example, the known scene samples collected in advance are marked manually. It is assumed that the known scene samples include a scene in which a face enters and then leaves a lens, the scene is marked as a "face recognition" scene. By analogy, a few known scene samples are marked in advance. The "unknown scene sample for which no scene is marked" is the sensing data obtained from the data capturing device 100C.

In addition, when the sensing data is a video stream or an audio stream, because the computing device 100B continuously receives a continuous video stream or audio stream, the scene detection module 201 may extract a video clip or audio clip from the continuous video stream or audio stream by using a video motion detection or voice activity detection method. Then, the scene semantic feature (the second scene semantic feature) is captured from the video clip or the audio clip. In another embodiment, the sensor 110 may include a motion detection sensor, and in response to that the motion detection sensor detects movement of an object, the first processing circuit 130 controls the sensor 110 to acquire the video clip or the audio clip. When the video stream or the audio stream is continuously transmitted to the computing device 100B, starting and ending time points of the video stream or the audio stream cannot be obtained, consequently the amount of data is too large to calculate. Therefore, the problem that the amount of data is too large to calculate can be solved by using the video motion detection or voice activity detection method, and the video clip or the audio clip can be transmitted to the computing device 100B.

In step S302, a plurality of recommended scenes is generated. For example, a trained scene semantic feature is compared with the first scene semantic feature and the second scene semantic feature to obtain a plurality of recommended scenes corresponding to the first scene semantic feature and the second scene semantic feature. Then, in step S303, a non-maximum suppression is executed on the recommended scene (associated with the first scene semantic feature or the second scene semantic feature) to filter the recommended scenes. That is, the plurality of possible recommended scenes are sorted according to confidence levels, and a recommended scene having a confidence level higher than a threshold is selected. If there is a plurality of recommended scenes whose confidence levels are higher than the threshold, the latest recommended scene may be selected from the plurality of recommended scenes whose confidence levels are higher than the threshold, to represent the current scene corresponding to the video clip or the audio clip extracted from the continuous video stream or audio stream.

After impossible, nonrelated, and undesirable recommended scenes are filtered off in step S303, the known scene samples and the unknown scene samples are screened based on the filtered recommended scenes, to keep unknown scene samples and known scene samples corresponding to a recommended scene having a high confidence level. Then, in step S304, semantic features of the known scene samples and the unknown scene samples corresponding to the filtered recommended scenes are input into a transductive support vector machine, to obtain (classify, identify) a scene corresponding to the sensing data. Afterward, it is determined based on a previous scene whether the scene has been transformed. If no scene is detected for previously received sensing data, it is determined, once a scene is detected, that the scene has been transformed.

Referring to FIG. 2, the service API management 202 includes an API converter 203 and a smart contract 204. The distributed ledger 205 includes an operation log 206.

The API convert 203 is responsible for translating a requirement into a service task. The requirement is a requirement of a user of an application program configured to execute a specified scene. After the API converter 203 translates the requirement into the service task, the service task is transmitted to the cloud server device 100A, so that a scheduler in the cloud server device 100A finds a resource having a corresponding resource capability, to meet the requirement.

The smart contract 204 is a program stored on a blockchain. The smart contract 204 can accept and transmit a virtual currency, and may define execution details therein. The smart contract 204 is responsible for checking the operation log 206 to determine whether to forcedly execute a service level agreement (SLA), to ensure that the network performance is kept at an acceptable level. The operation log 206 may be an operation log of the computing device 100B or an operation log fed back by the cloud server device 100A. For example, for a subsequent network, the current performance and the like of the network are prepared and determined. Because all resource providers are on the same distributed ledger, the smart contract 204 can more easily check the SLA. If the smart contract 204 finds that the operation log 206 does not comply with the SLA, the smart contract 204 sends an SLA feedback to a corresponding resource provider in the cloud server device 100A), to perform necessary resource adjustment.

In addition, in the data capturing device 100C, the second processing circuit 140 may also read the operation log in the distributed ledger 151, and send an SLA feedback to a corresponding resource provider in the cloud server device 100A.

The computing device 100B further uses the machine learning model corresponding to the current scene to capture the feature data (feature data of the calculation side) from the sensing data and uses the library corresponding to the current scene to convert the requirement into a service task of the calculation side, and transmits the service task to the cloud server device 100A, so that the cloud server device 100A executes a service negotiation and executes subsequent analysis and prediction, thus determining that the service task of the calculation side is feasible. After it is determined that the service task of the calculation side is feasible, the machine learning model and the library are deployed to the data capturing device 100C through the computing device 100B.

Figure 4:
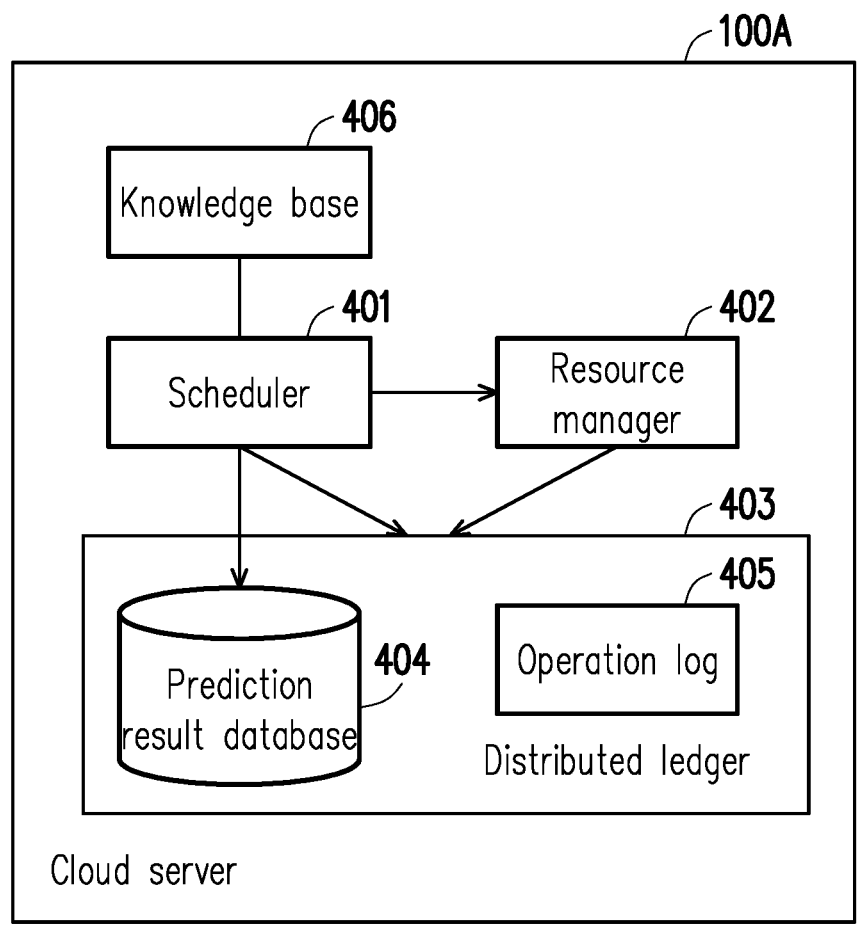
FIG. 4 is a block diagram of a cloud server device according to an embodiment of the present invention.

FIG. 4 is a block diagram of a cloud server device according to an embodiment of the present invention. Referring to FIG. 4, the cloud server device 100A provides the scheduler 401, the resource manager 402, the distributed ledger 403 and the knowledge base 406. The scheduler 401 is, for example, designed to present a task service level agreement (TSLA) interface to negotiate execution of the service task. The resource manager 402 is, for example, designed to present a resource service level agreement (RSLA) interface, to negotiate on rights of resource consumption. Before forwarding the service task, the scheduler 401 needs to obtain a commitment of the resource manager 402, so as to obtain a resource required for executing the service task, and processing corresponding to the service task can gain a confidence in finishing within a specified time.

The distributed ledger 403 is configured to ensure that the SLA is put into practice, including an operation log 405 and a prediction result database 404. The scheduler 401 and the resource manager 402 write the operation log 405 into the distributed ledger 403. In the computing device 100B, the service API management 202 may read the operation log 206 from the distributed ledger 205 for SLA analysis, and then send an SLA feedback to the cloud server device 100A for necessary adjustment. The knowledge base 406 stores a plurality of machine learning models and a plurality of corresponding libraries. The prediction result database 404 is configured to store a classification result or a regression result. In another embodiment, the knowledge base 406 further stores a particular configuration of the plurality of machine learning models. The particular configuration includes the number and order of resources to be used, so that the scheduler executes the service task according to the particular configuration.

Figure 5:
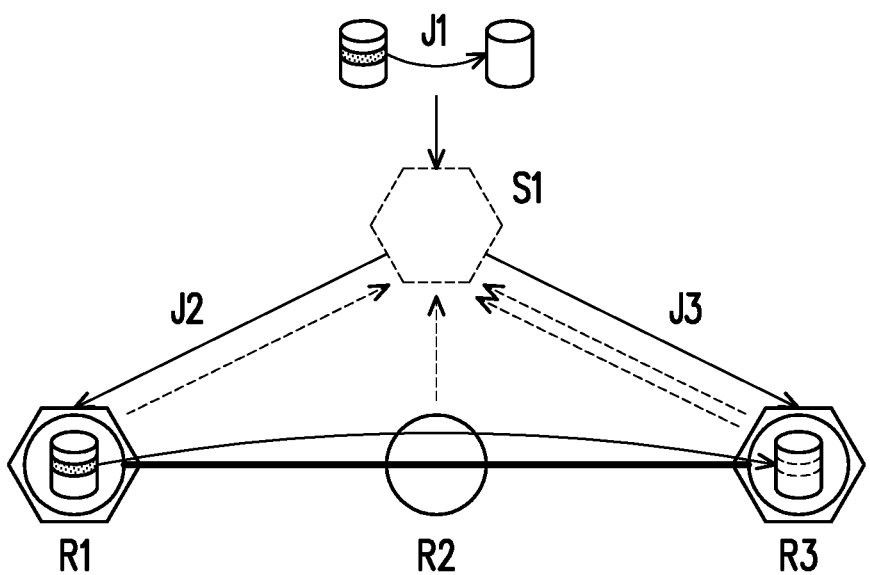
FIG. 5 is a schematic diagram illustrating a service negotiation of a cloud server device according to an embodiment of the present invention.

FIG. 5 is a schematic diagram illustrating a service negotiation of a cloud server device according to an embodiment of the present invention. Referring to FIG. 5, a scheduler S1 (corresponding to the scheduler 401 in FIG. 4) is presented as a TSLA interface. A resource manager R2 (corresponding to the resource manager 402 in FIG. 4) is presented as an RSLA interface. The source resource R1 and the target resource R3 is presented as an RSLA interface.

The computing device 100B or the data capturing device 100C submits a service task J1 to the scheduler S1. After receiving the service task J1, the scheduler S1 selects a machine learning model corresponding to the service task J1 as the resource manager R2, and ensures data reservation of the source resource R1 and the target resource R3 of the resource manager R2. The source resource R1 is the feature data, and the target resource R3 is the prediction result database.

The scheduler S1 is responsible for dividing the service task J1 into a first target task J2 and a second target task J3. Because the service task J1 needs to be notified to two endpoints of the resource manager R2 (the source resource R1 and the target resource R3), the service task J1 is divided into the first target task J2 and the second target task J3. Before executing the first target task J2 and the second target task J3, the scheduler S1 needs to ensure the data reservation of the source resource R1 and the target resource R3 of the resource manager R2.

After the scheduler S1 confirms the data reservation of the source resource R1 and the target resource R3, the scheduler S1 executes the first target task J2, inputs the source resource R1 (the feature data) to the resource manager R2 (the machine learning model), and transmits an output of the resource manager R2 to the target resource R3 (the prediction result database). The scheduler S1 executes the second target task J3, and requests the target resource R3 (the prediction result database) to report a result to the scheduler S1.

In addition, when there are two scenes, there are correspondingly two requirements. Each requirement is converted into one service task. For each service task, the scheduler S1 assigns a resource separately. Therefore, there is no particular order for a plurality of service tasks.

Referring to FIG. 4, the distributed ledger 403 further stores a device identification code or a user identification code of the data capturing device 100C. The user performs verification through the distributed ledger 403, and after the verification is passed, can access the prediction result database 404. The distributed ledger 403 computes usage of the user for charging. In an embodiment, an IOTA crypto currency is sued. For example, it is assumed that the developer of the application program will be charged if using data in the prediction result database 404.

When the user is authorized to access the classification result of "face recognition", the user can know people that pass through the area monitored by the particular data capturing device 100C. The cloud server device 100A provides a profit sharing mode. That is, once the user pays a virtual currency to the cloud server device 100A to use data in the prediction result database 404 to create the application program, the cloud server device 100A feeds back the virtual currency to the distributed ledger 151 of the data capturing device 100C. Therefore, the user collects the sensing data by setting the data capturing device 100C, so as to obtain a money reward, encouraging the user to buy a plurality of data capturing devices to collect the sensing data.

Figure 6:
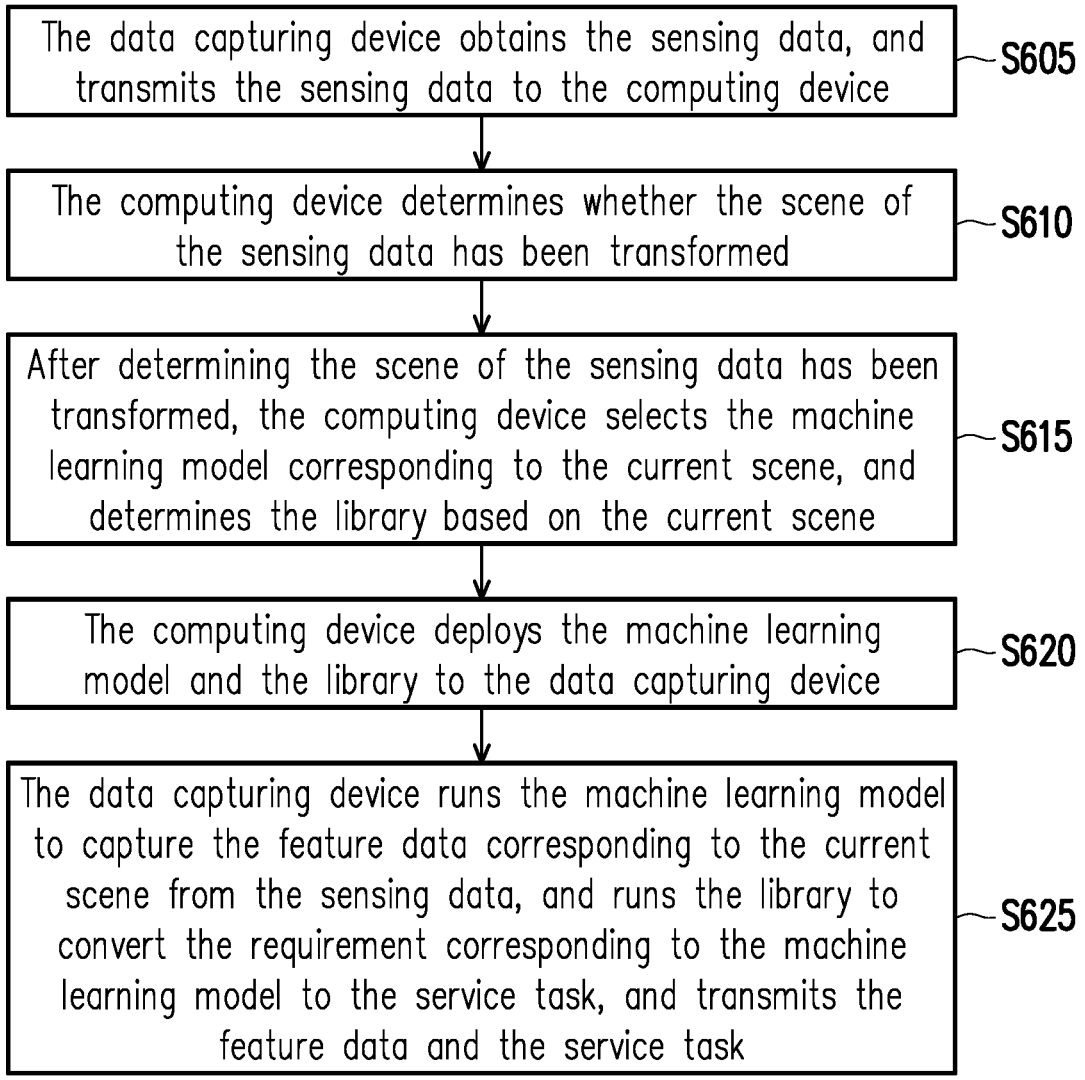
FIG. 6 is a flowchart of a data calculation method according to an embodiment of the present invention.

Steps of the data calculation method are described below with reference to FIG. 1 to FIG. 5. FIG. 6 is a flowchart of a data calculation method according to an embodiment of the present invention. Referring to FIG. 6, in step S605, the data capturing device 100C obtains sensing data, and transmits the sensing data to the computing device 100B. Then, in step S610, through the computing device 100B determines whether a scene of the sensing data has been transformed. The scene detection method can be referred to the description of step S301 to step S304 in FIG. 3.

The data capturing device 100C continuously transmits the sensing data collected by the sensor 110 to the computing device 100B, and the computing device 100B determines whether the current scene of the sensing data has been transformed, and when determining that the scene changes, re-deploy the first processing circuit 130 and the second processing circuit 140 of the data capturing device 100C. When it is detected that the scene does not change, the data capturing device 100C does not need to be re-deployed.

In step S615, when it is determined that the scene of the sensing data has been transformed, the computing device 100B selects a machine learning model corresponding to the current scene, and determines a library based on the current scene. Further, when the computing device 100B detects through the scene detection module 201 that the scene changes, sends the service task (the service task of the calculation side through the API converter 203, and records, in a header of the service task, the machine learning model corresponding to the detected scene. For example, the machine learning model corresponding to the "face recognition" scene is a FaceNet model; the machine learning model corresponding to the "speech recognition" scene is an automatic recognition model; the machine learning model corresponding to the "motion positioning" scene is a single-stream temporal action proposals model.

In addition, the computing device 100B further transmits the feature data (the feature data of the calculation side) captured from the sensing data to the cloud server device 100A.

After the cloud server device 100A receives the service task of the calculation side and the feature data of the calculation side from the computing device 100B, the scheduler 401 captures the corresponding machine learning model and library from the knowledge base 406 according to the machine learning model recorded in the header. Then, the cloud server device 100A executes a service negotiation shown in FIG. 5 to determine whether the work flow of the source resource R1 (the feature data of the calculation side received from the computing device 100B), the resource manager R2 and the target resource R3 is feasible. After determining that the work flow is feasible, in step S620, the computing device 100B deploys the machine learning model and the library to the data capturing device 100C.

In another embodiment, if the execution of the cloud server device 100A fails, the computing device 100B adjusts the machine learning model or the library, for example, adjust the library conversion rule, so that the resource of the cloud server device 100A can complete the execution.

After the deployment of the data capturing device 100C is complete, in step S625, the data capturing device 100C runs the machine learning model to capture the feature data corresponding to the current scene from the sensing data, and runs the library to convert the requirement corresponding to the machine learning model into a service task, and transmits the feature data and the service task. That is, the data capturing device 100C transmits the feature data and the service task to the cloud server device 100A. Then, through the cloud server device 100A generates a prediction result based on the service task and the feature data transmitted by the data capturing device 100C, and stores the prediction result to the prediction result database 404.

After receiving the feature data and the service task (the feature data of the data side and the service task of the data side) from the data capturing device 100C, the cloud server device 100A executes a service negotiation according to the feature data of the data side and the service task of the data side. That is, the scheduler 401 captures the corresponding machine learning model from the knowledge base 406 according to the machine learning model recorded in the header of the service task. Then, the cloud server device 100A executes the service negotiation shown in FIG. 5. The machine learning model is input as the resource manager R2 and the feature data of the data side received from the data capturing device 100C is input as the source resource R1 to the resource manager R2. An output of the resource manager R2 (that is, classification or regression result) is stored into the prediction result database 404 (the target resource R3). Thus, the classification or regression result of the feature data is obtained.

In another embodiment, the machine learning model corresponding to the current scene and deployed on the data capturing device 100C is configured to capture the machine learning model of the feature, and the machine learning model in the knowledge base in the cloud server device 100A is a model for analyzing or predicting the corresponding service task. The machine learning models on the two sides may be the same model, or may be different models for executing different operations for the same scene. The configuration of the machine learning models on the two sides to execute different operations can reduce the calculation burden. In addition, the sensing data does not need to be transmitted, but the feature data is transmitted to the cloud server device 100A, thereby reducing the amount of data transmitted.

The user may access the recognition result of the particular scene of the prediction result database 404 through the database API. For example, for face recognition, the recognition result can be used for gate control, attendance evaluation auditing, and the like. In addition, the change of the scene is also an object accessible to the user and can be used for analyzing elements of the change of the scene of the place, providing a basis for pricing, renting targets, advertising, and the like. In another embodiment, the cloud server device 100A may transmit the result in the prediction result database 404 to the data capturing device 100C for display to the user.

In summary, through the above embodiments, the user can set at least one data capturing device in a plurality of particular places to collect data. The data capturing device only needs to transmit the sensing data to the computing device, and the computing device detects whether the scene changes. When detecting that the scene changes, the computing device re-deploys the data capturing device. Thus, the deployment of the data capturing device does not need to be set manually. In addition, the data capturing device also automatically feeds back to the cloud server device. With the data collected by the data capturing device, the user can obtain a money award, making the user more willing to increase the number of data capturing devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A data capturing device, comprising:
   a sensor, configured to obtain sensing data, wherein a current scene is determined by analyzing whether the sensing data includes a scene for face recognition, speech recognition, motion positioning or sound recognition;
   a first processing circuit, coupled to the sensor, and configured to run a machine learning model corresponding to the current scene to capture feature data corresponding to the current scene from the sensing data; and
   a second processing circuit, coupled to the first processing circuit, and configured to run a library corresponding to the current scene to convert a requirement corresponding to the machine learning model into a service task, wherein the machine learning model is recorded in a header of the service task, and transmit the service task and the feature data through a communication chip to a cloud server device, such that the cloud server device generates a prediction result based on the service task and the feature data transmitted.

2. The data capturing device according to claim 1, further comprising:
   a storage device, comprising a distributed ledger,
   wherein a virtual currency is received from the cloud server device through the communication chip, and stored to the distributed ledger.

3. The data capturing device according to claim 1, further comprising: the communication chip,
   wherein the sensing data is transmitted to a computing device through the communication chip, and the machine learning model and the library corresponding to the current scene are received from the computing device.

4. A data calculation system, comprising:
   a computing device and a data capturing device, wherein the data capturing device comprises:
      a sensor, configured to obtain sensing data;
      a first communication chip, configured to transmit the sensing data to the computing device;
      a first processing circuit, coupled to the sensor and the first communication chip; and
      a second processing circuit, coupled to the first communication chip and the first processing circuit; and
   the computing device comprises:
      a second communication chip, configured to establish a communication connection with the first communication chip, to receive the sensing data from the data capturing device; and
      a processor, coupled to the second communication chip,
   wherein in the computing device, the processor determines whether a current scene of the sensing data has been transformed, and in response to determining the current scene of the sensing data has been transformed, the processor selects a machine learning model corresponding to the current scene, determines a library based on the current scene, and deploys the machine learning model and the library to the data capturing device through the communication connection, wherein the current scene is determined by analyzing whether the sensing data includes a scene for face recognition, speech recognition, motion positioning or sound recognition, and
   after the machine learning model and the library are deployed to the data capturing device, the first processing circuit runs the machine learning model to capture feature data corresponding to the current scene from the sensing data, and the second processing circuit runs the library corresponding to the current scene to convert a requirement corresponding to the machine learning model into a service task, wherein the machine learning model is recorded in a header of the service task, and transmits the service task and the feature data through the first communication chip to a cloud server device, such that the cloud server device generates a prediction result based on the service task and the feature data transmitted.

5. The data calculation system according to claim 4, wherein in the computing device,
the processor captures a first scene semantic feature from each of a plurality of known scene samples and captures a second scene semantic feature from each of a plurality of unknown scene samples obtained from the sensing data, then compares a trained scene semantic feature with the first scene semantic feature and the second scene semantic feature to obtain a plurality of recommended scenes corresponding to the first scene semantic feature and the second scene semantic feature, and executes a non-maximum suppression on the recommended scenes to filter the recommended scenes,
the known scene samples and the unknown scene samples are screened based on the filtered recommended scenes; and
the processor inputs semantic features of the known scene samples and the unknown scene samples corresponding to the filtered recommended scenes into a transductive support vector machine to obtain the scene corresponding to the sensing data, and determines based on a previous scene whether the scene has been transformed.

6. The data calculation system according to claim 4, wherein in the computing device,
the processor captures the feature data corresponding to the current scene from the sensing data by using the machine learning model corresponding to the current scene, converts the requirement corresponding to the machine learning model into the service task based on the library corresponding to the current scene, and transmits the feature data and the service task to the cloud server device through the second communication chip.

7. The data calculation system according to claim 4, further comprising: the cloud server device, wherein the cloud server device comprises:
a scheduler;
the scheduler receives the feature data and the service task from the computing device or the data capturing device, executes a service negotiation to assign at least one resource through the service negotiation, and executes another machine learning model by using the at least one resource to obtain a result.

8. The data calculation system according to claim 7, wherein the service negotiation comprises:
selecting, by the scheduler, the other machine learning model corresponding to the service task from a knowledge base as a resource manager, and ensuring data reservation of a source resource and a target resource of the resource manager, wherein the source resource is the feature data, and the target resource is a prediction result database,
generating, by the scheduler, a first target task and a second target task based on the service task,
executing, by the scheduler, the first target task, comprising: inputting the feature data into the other machine learning model, and transmitting an output of the other machine learning model to the prediction result database, and
executing, by the scheduler, the second target task, comprising: requesting the prediction result database to report the result.

9. The data calculation system according to claim 6, wherein
the data capturing device further comprises: a distributed ledger,
wherein a virtual currency is received from the cloud server device through the first communication chip, and stored to the distributed ledger.

10. A data calculation method, comprising:
obtaining, by a data capturing device, a sensing data, and transmitting the sensing data to a computing device;
determining, by the computing device, whether a current scene of the sensing data has been transformed, wherein the current scene is determined by analyzing whether the sensing data includes a scene for face recognition, speech recognition, motion positioning or sound recognition;
selecting, by the computing device in response to determining that the current scene of the sensing data has been transformed, a machine learning model corresponding to the current scene, and determining a library based on the current scene;
deploying, by the computing device, the machine learning model and the library to the data capturing device; and
running, by the data capturing device, the machine learning model to capture feature data corresponding to the current scene from the sensing data, running the library to convert a requirement corresponding to the machine learning model into a service task, wherein the machine learning model is recorded in a header of the service task, and transmitting the feature data and the service task to a cloud server device, such that the cloud server device generates a prediction result based on the service task and the feature data transmitted.

11. The data calculation method according to claim 10, wherein after the feature data and the service task are transmitted to the cloud server device, the data calculation method further comprises:
generating, by the cloud server device, a result based on the service task and the feature data, and storing the result to a prediction result database.

12. The data calculation method according to claim 10, wherein the step of determining, by the computing device, whether a scene of the sensing data has been transformed includes:
capturing a first scene semantic feature from each of a plurality of known scene samples and capturing a second scene semantic feature from each of a plurality of unknown scene samples obtained from the sensing data;
comparing a trained scene semantic feature with the first scene semantic feature and the second scene semantic feature to obtain a plurality of recommended scenes corresponding to the first scene semantic feature and the second scene semantic feature;
executing a non-maximum suppression on the recommended scenes to filter the recommended scenes;
screening the known scene samples and the unknown scene samples based on the filtered recommended scenes;
inputting semantic features of the known scene samples and the unknown scene samples corresponding to the filtered recommended scenes into a transductive support vector machine to obtain a scene corresponding to the sensing data; and
determining based on a previous scene whether the scene has been transformed.

13. The data calculation method according to claim 10, wherein after the step of selecting, by the computing device, the machine learning model corresponding to the current scene and determining the library based on the current scene, the method further comprises:

capturing, by the computing device, the feature data corresponding to the current scene from the sensing data by using the machine learning model corresponding to the current scene;

converting, by the computing device, the requirement corresponding to the machine learning model into the service task based on the library corresponding to the current scene; and transmitting, by the computing device, the feature data and the service task to the cloud server device.

14. The data calculation method according to claim 10, further comprising:

receiving, by the cloud server device, the feature data and the service task from the computing device or the data capturing device, executing a service negotiation to assign at least one resource through the service negotiation, and executing another machine learning model by using the at least one resource to obtain a result.

15. The data calculation method according to claim 14, wherein the service negotiation includes:

selecting the other machine learning model corresponding to the service task from a knowledge base as a resource manager, and ensuring data reservation of a source resource and a target resource of the resource manager, wherein the source resource is the feature data, and the target resource is a prediction result database, generating a first target task and a second target task based on the service task, executing the first target ask, comprising: inputting the feature data into the other machine learning model, and transmitting an output of the other machine learning model to the prediction result database, and executing the second target task, comprising: requesting the prediction result database to report the result.

16. The data calculation method according to claim 10, further comprising:

receiving, by the data capturing device, a virtual currency from the cloud server device, and storing the virtual currency to a distributed ledger.

* * * * *